March 4, 1947. J. E. MORTON 2,416,940
FLUID PRESSURE MOTORS
Filed April 13, 1945 4 Sheets-Sheet 3
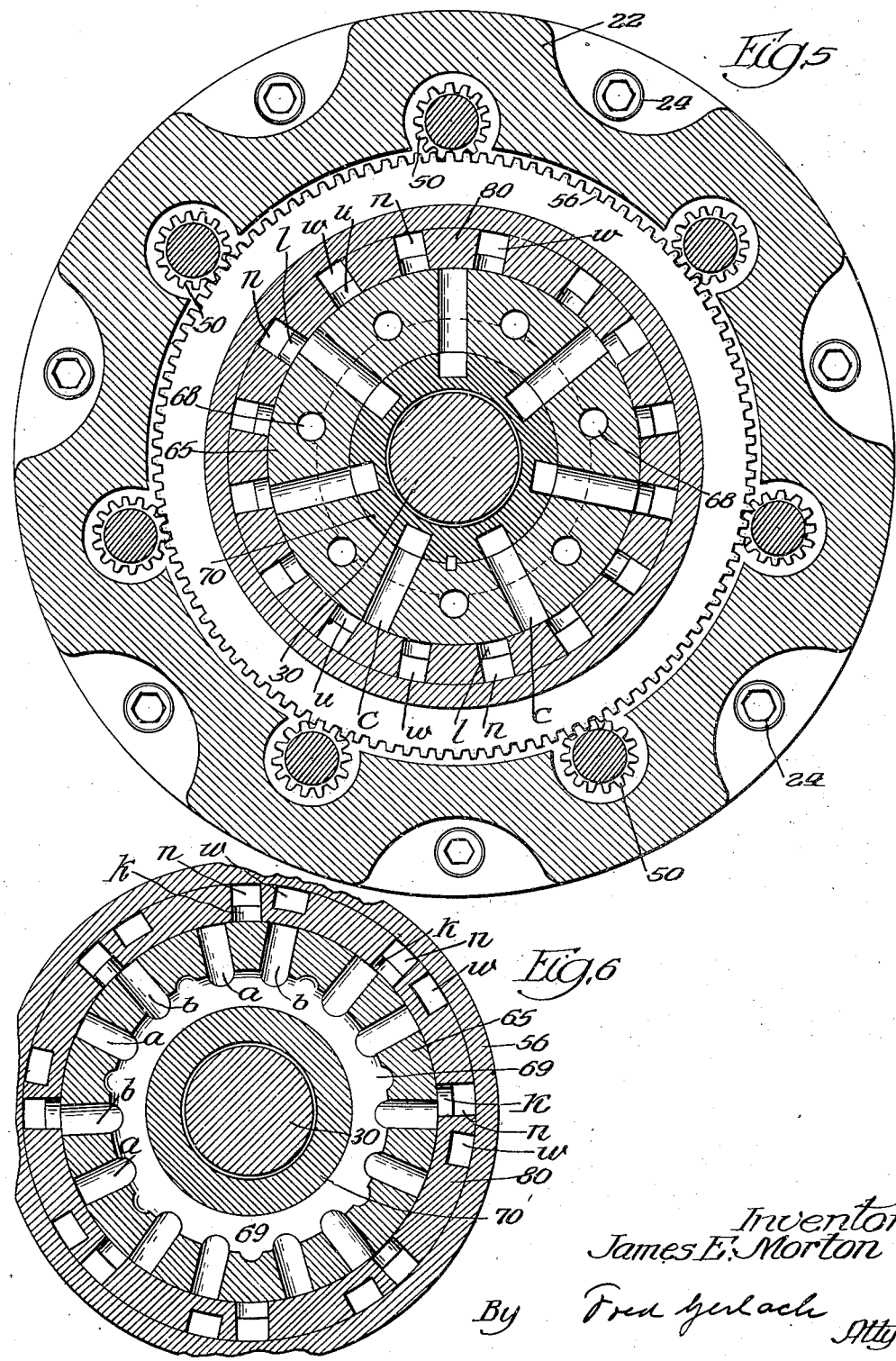
Inventor
James E. Morton
By Fred Gerlach Atty

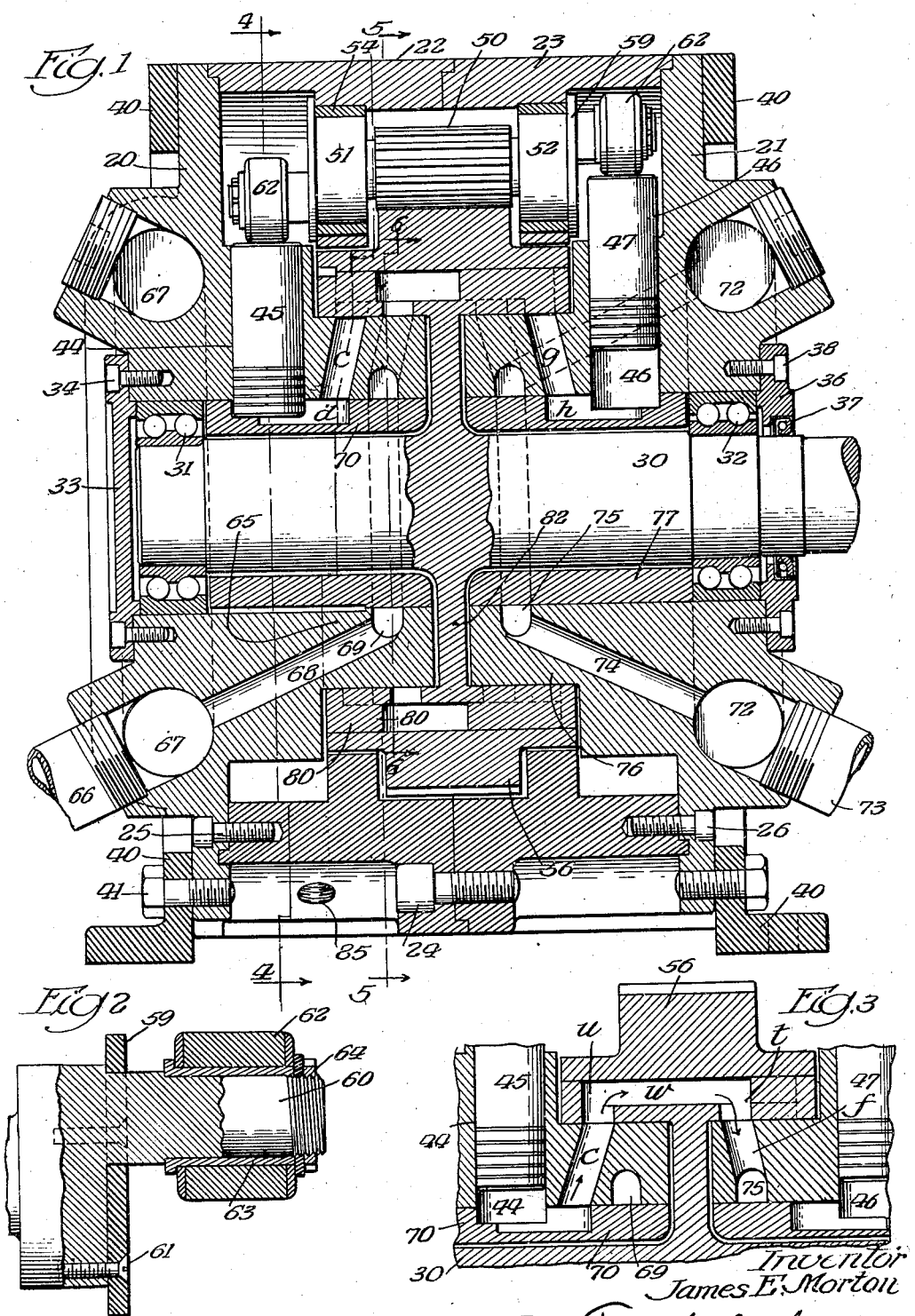

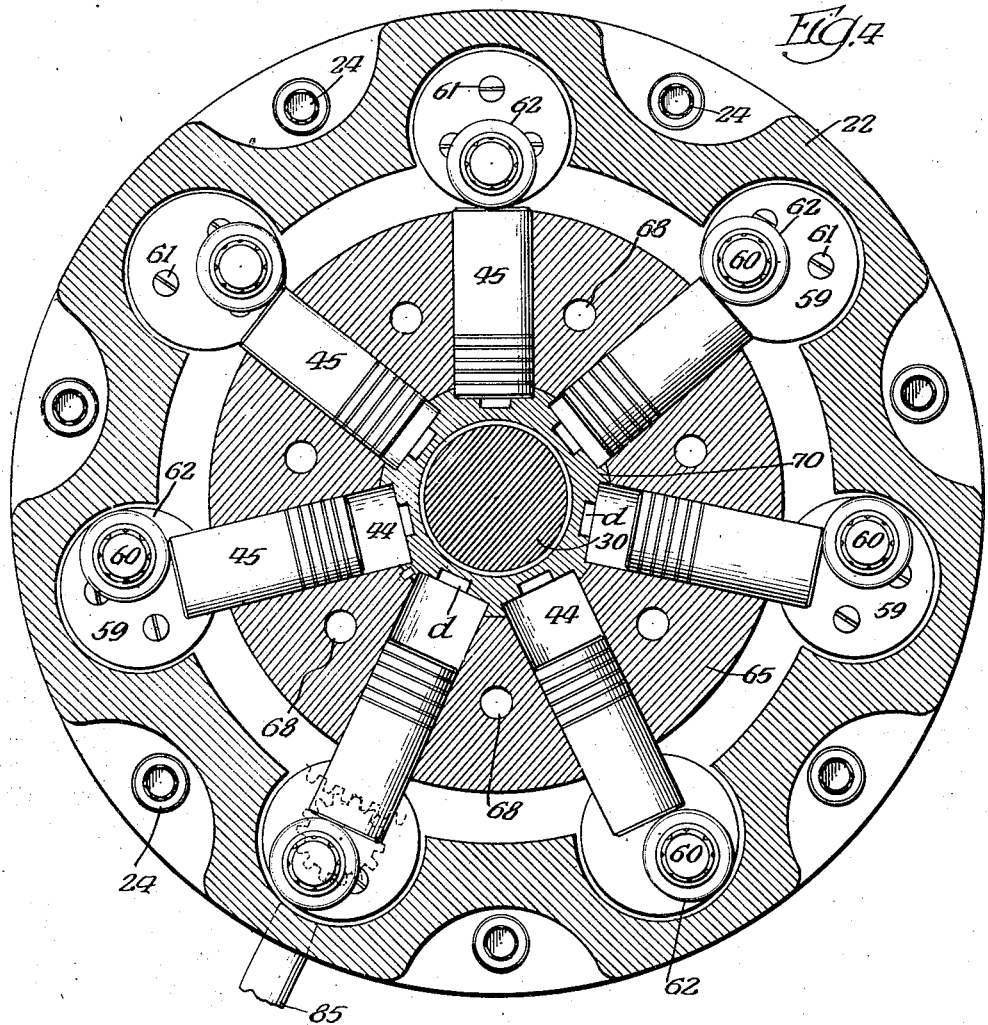

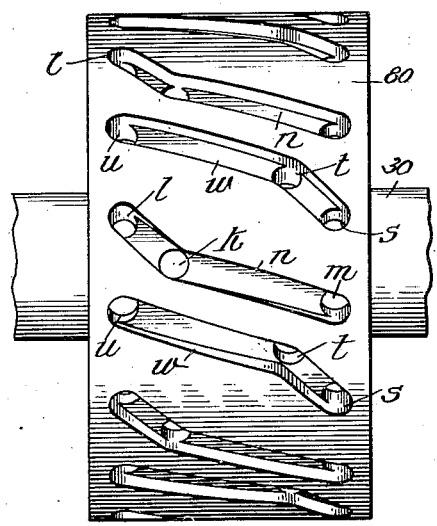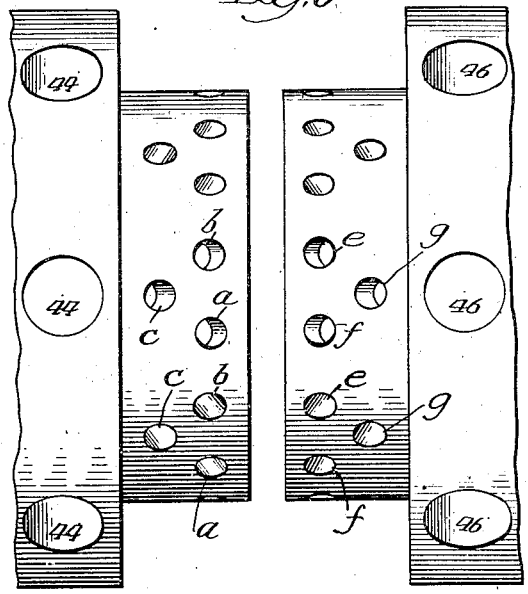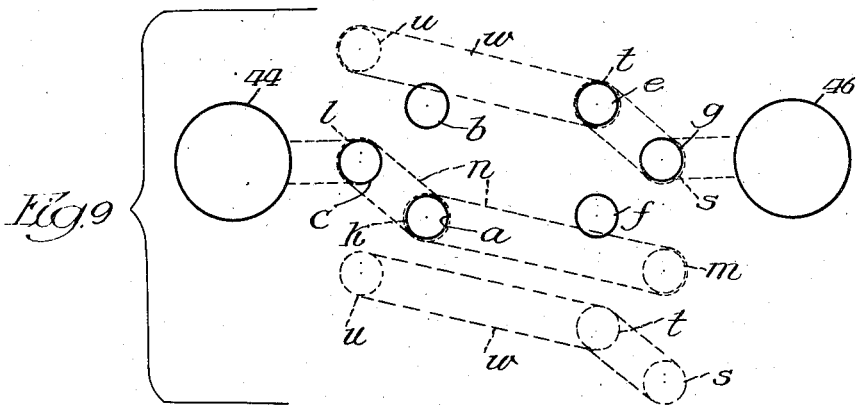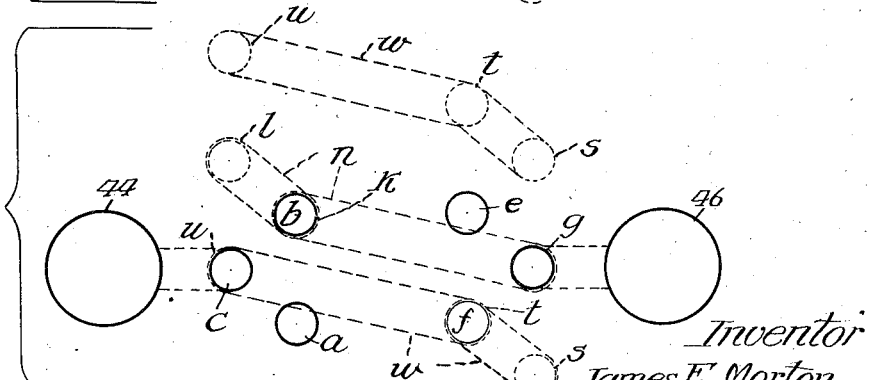

Patented Mar. 4, 1947

2,416,940

UNITED STATES PATENT OFFICE 2,416,940

FLUID PRESSURE MOTOR

James E. Morton, Harvey, Ill.

Application April 13, 1945, Serial No. 588,171

15 Claims. (Cl. 121—121)

The invention relates to motors operable by fluid under pressure.

One object of the invention is to provide a motor of the radial cylinder type which is adapted for delivering high torque to a driven element.

Another object of the invention is to provide a motor of this type which includes crank elements operable by pistons in a series of radial cylinders, for driving a shaft in the motor casing, through a series of pinions and a gear.

Another object of the invention is to provide a motor of this type which is adapted to deliver substantially constant torque for driving a shaft with producing pulsations in the shaft.

Other objects will appear from the detailed description.

The invention consists in the several features hereinafter set forth and more particularly defined by claims at the conclusion hereof.

In the drawings:

Fig. 1 is a longitudinal section of a motor embodying the invention.

Fig. 2 is a section through one of the crank rollers operated by one of the pistons.

Fig. 3 is a section illustrating the valve-means positioned for an exhaust stroke of a piston in one of the cylinders.

Fig. 4 is a section taken on line 4—4 of Fig. 1, parts being shown in elevation.

Fig. 5 is a section taken on line 5—5 of Fig. 1.

Fig. 6 is a section taken on line 6—6 of Fig. 1.

Fig. 7 is a plan view of the rotatable valve-sleeve.

Fig. 8 is a plan of the annular members on the casing-sections with the ports therein.

Fig. 9 is a diagrammatic view illustrating a group of the valve-ducts and ports in their co-relative positions when fluid under pressure is delivered to one of a pair of longitudinally aligned cylinders and is exhausted from the other.

Fig. 10 is a similar view illustrating the valve-ducts and ports in their co-relative positions when the flow of fluid is reversed in said cylinders.

The invention is exemplified in a sectional casing which comprises: a head or end-section 20, a head or end-section 21, and a pair of annular or generally cylindrical sections 22 and 23 extending between the end sections 20 and 21. The cylindrical or annular sections 22, 23 have meeting faces substantially at the longitudinal center of the casing and are rigidly secured together by a series of screws 24. Head or end-section 20 is secured by screws 25 against the outer end face of annular section 22. Head or end-section 21 is similarly secured by screws 26 against the outer end face of annular section 23. A shaft 30 functions as the driven element or output shaft, extends longitudinally across the casing and is journalled in an anti-friction bearing 31 in head 20 and a similar bearing 32 in head 21. A cap 33 is removably secured by screws 34 to the outer face of head 20 and forms a closure at one end of shaft 30 and bearing 31. A ring 36 provided with an oil seal 37 around shaft 30, is secured by screws 38 to the outer face of head 21. Shaft 30 extends through ring 36 for driving any desired equipment. The casing may be supported by rings 40 which are secured by screws 41 to the outer face of heads 20, 21, respectively. Any suitable means may be used supporting the casing, according to the purpose for which the motor is used.

A series of radial cylinders 44, symmetrically disposed around the axis of shaft 30, are formed in an inwardly extending integral portion of the head 20. A similar series of radial cylinders 46 are formed in an integral inwardly extending portion of head 21. The cylinders 44 formed in head 20 are longitudinally aligned with cylinders 46 of the cylinders in head 21, respectively. A piston 45 is radially slidable in each cylinder 44 and a similar piston 47 is radially slidable in each cylinder 46.

Pinions 50, corresponding in number to the number of cylinders in each series of cylinders, are rotatably supported in, and extend across the longitudinal center of, the casing. Each pinion 50 is provided with a bearing 51 in the casing section 22 and a bearing 52 in casing section 23, and each of said bearings is journalled in a bushing 54. All of the pinions 50 mesh with a gear 56 which is connected to drive the shaft 30 by power derived from the pinions 50. One end of each pinion 50 has connected thereto a crank-element, which is adapted to be operated by a piston 45 in the series of cylinders 44 at one end of the casing and its other end has connected thereto a crank-element adapted to be operated by a piston 47 in the series of cylinders 46 adjacent the opposite end of the casing. Each of these crank-elements is exemplified by crank pins 60 (Fig. 2) which are integrally formed with pinions 50 and a roller 62 on each crank-pin adapted to be engaged by the outer end of one of the pistons 45 and 47 and journalled on a bushing 63 around crank-pin 60. Each pinion 50 is held against endwise movement by disks 59 which are secured by screws 61 to the ends of the pinions. Bushing 63 is secured on its crank-pin 60 by a nut or screw collar 64. The crank-pins 60 on the opposite ends of each pinion 50 are disposed diametrically opposite so that outward power strokes will be alternately imparted to said crank-elements.

The flow of fluid under pressure to the cylinders of both series and its exhaust therefrom, is controlled by valve-means which is operated by the rotation of gear 56 in the casing for operating pistons 45 in rotative succession and pistons 47 in rotative succession and to impart alternating power and exhaust strokes to longitudinally aligned pistons. Fluid under pressure is delivered by a pipe 66 into an annular duct 67 formed in head 20 and then conducted by a series of ports 68 to an annular channel 69 which is formed in an integral extension 65 of head 20. An inner sleeve 70 fits in a central bore in head 20 and extension 65 and forms the inner side of channel 69 and is keyed to or fixedly secured in said head. An annular channel 72 is formed in head 21 and is connected to a pipe 73 for exhaust fluid. Ports 74 communicatively connect an annular channel 75 which is in an integral extension 76 on head 21 to duct 72. An inner sleeve 77 fits in a central bore of extension 76 of head 21 and is keyed thereto and forms the inner periphery of channel 75. A sleeve 80 has its inner periphery fitting around the outer periphery of extensions 65 and 76 of the casing, and functions as a rotatable valve member around extensions 65 and 76 in the casing for controlling the flow of fluid from channel 69 to pairs of cylinders 44 and 46 in succession for alternately imparting power strokes to pistons 45 and 47 therein and the exhaust of fluid from the cylinders during the exhaust stroke of said pistons. Power strokes are alternately imparted to the crank-elements on a pinion 50 by a longitudinally aligned pair of pistons 45 and 47, and during the power strokes delivered to each crank-element on one end of pinion 50, the crank-element on its opposite end will impart the exhaust stroke to the other piston of said pair.

Valve-sleeve 80 is rotatable with gear 56 and shaft 30. Gear 56 is in the form of a ring fitting on the outer periphery of and fixed to said sleeve 80 so as to form a closure for the channels which form the ducts $n$ and $w$. Sleeve 80 may be integrally formed with shaft 30 and joined thereto by a central web 82 which extends between the inner ends of casing extensions 65 and 76 and sleeves 70 and 77.

A drain pipe 85 for oil is connected to the casing (Fig. 4). Oil under pressure is usually used as the operating fluid. The oil in the ducts and ports in sleeve 80 and extensions 65 and 76 lubricates the peripheral surfaces between said sleeve and surfaces.

The operation of each of these groups of ports for controlling the operation of a pair of pistons 45 and 47, which are operatively connected to one of the pinions 50 will be as follows (Figs. 7-10): When the rollers 62 are in their neutral position and the pistons 45 and 47 engaging said rollers are at the commencement of power and exhaust strokes, respectively, communication between radial ports $a$ and $b$ and cylinder 44 and between ports $e$ and $f$ and cylinder 46 will be cut off by the inner periphery of valve-sleeve 80. During 22½ degrees of clockwise rotation of sleeve 80, fluid under pressure will flow from channel 69 through port $a$ (Fig. 6) in member 65, port $k$ in sleeve 80, duct $n$, port $c$ in member 65 and duct $d$ to the inner end of cylinder 44 and impart a power stroke to piston 45 which will rotate the crank-element on one of the pinions 50 and drive said pinion one-half revolution. During the same movement, valve-sleeve 80 will establish communication for exhausting fluid from cylinder 46 through duct $h$ in sleeve 77, port $g$, port $s$, duct $w$, port $e$ in member 76 and the annular channel 75, illustrated in Fig. 9. At the end of said movement, the flow of fluid to cylinder 44 and the outflow of fluid from cylinder 46 will be cut off by sleeve 80. During the next 22½ degrees of rotation of sleeve 80, fluid under pressure, as illustrated in Fig. 10, will be delivered to cylinder 46 from annular channel 69 through radial port $b$, port $k$, duct $n$, port $m$, in succeeding sleeve 80, radial port $g$, and duct $h$ in sleeve 77 to the inner end of cylinder 46 and impart a power stroke to piston 47. During the same movement of valve-sleeve 80 fluid will be exhausted from cylinder 44 through duct $d$, radial port $c$, port $u$, duct $w$, port $t$ in sleeve 80, radial port $f$, channel 75 and duct 74 to the annular duct 72. Communication between cylinders 44 and annular channel 75 and between cylinder 46 and annular channel 69 will next be cut off by valve-sleeve 80. This cycle of operation of the same pair of cylinders, 44 and 46, will then be repeated by each group of ports and ducts in sleeve 80, in rotative succession.

Groups of ducts and ports are provided in the annular members 65 and 76 of the casing for delivering fluid to and exhausting it from the pairs of longitudinally aligned cylinders 44 and 46, and the flow through said ducts and ports is controlled by groups of ports and ducts in valve-sleeve 80. The groups of ports and ducts in sleeve 80 control the flow of fluid to and from longitudinally aligned pairs of cylinders 44 and 46 in rotative succession. The group of ducts and ports in the casing for each pair of cylinders 44 and 46 comprises: a pair of circumferentially aligned radial ports $a$ and $b$ which extend between annular channel 69 and the outer periphery of annular extension or member 65; a port $c$ extending from the periphery of member 65 to a longitudinal duct $d$ in sleeve 70 which communicates with a cylinder 44; a pair of circumferentially aligned radial ports $e$ and $f$ between annular channel 75 and the outer periphery of annular extension or member 76; a radial port $g$ between sleeve 77 and the outer periphery of extension or member 76; a longitudinal duct $h$ formed in sleeve 77 and communicatively connected with the inner end of a cylinder 46; a radial port $k$ in sleeve 80 adapted to register with ports $a$ and $b$; a radial port $l$ in sleeve 80 adapted to register with a port $c$; a radial port $m$ in sleeve 80 adapted to register with a port $g$; a duct $n$ communicatively connecting ports $l$, $k$, and $m$ and formed in sleeve 80; a port $t$ in sleeve 80 adapted to register successively with ports $e$ and $f$; a port $s$ in sleeve 80 adapted to register with port $g$; a port $u$ in sleeve 80 adapted to register with port $c$; and a duct $w$ in sleeve 80 which communicatively connects ports $t$, $s$, and $u$.

The operation of each longitudinally aligned pair of pistons 45 and 47 will be repeated by each rotatively successive group of ports and ducts in sleeve 80 and each of said group of ports will cause the operation of all pairs of pistons 45 and 47 in rotative succession in the manner as described.

During the reciprocations of the pistons, the rollers 62 engaged thereby roll across the outer ends of the pistons. In the construction illustrated, there are seven cylinders 44 longitudinally aligned with a like number of cylinders 46 and eight groups of valve-ports and ducts in the sleeve 80. The ratio of gear 56 and pinions 50 is eight to one so that during each revolution of gear 56 eight power strokes will be imparted to each of the pistons 45 and 47. For example: each pinion 50 may be provided with 14 teeth and the gear 56 with 112 teeth. The crank-elements on pinions 50 will always lag a distance corresponding to two teeth behind the next succeeding pinion. The pinions 50 are equidistantly spaced around the axis of shaft 30 and the groups of valve-ports for each longitudinally aligned number of cylinders are greater in number than the number of pinions.

As a result of operating the pinions 50 through crank-elements on the pistons, the motor is adapted to deliver enormous torque to the output shaft 30. As the result of the operation of the valve-means with the greater number of groups of valve-ports than the number of pistons in each annular series of cylinders, an exceptionally even flow of power is produced without pulsations in the output shaft 30.

The sectional formation of the casing provides for removal of each series of cylinders and pistons with one of the end-sections. The bearings 31 and 32 are end-wise removable from said sections. The construction described facilitates assembly of the motor and access to the parts for removal or replacement.

When fluid under pressure is delivered to the annular duct 67, shaft 30 will be driven in one direction. The motor is reversible by using annular duct 72 for delivering fluid under pressure to the motor and exhausting fluid through duct 67. The valve-means then controls the flow of fluid to and from the cylinders for reverse operation of the motor. The motor may be operated by hydraulic fluid, such as oil, or any other suitable fluid under pressure.

The invention exemplifies a motor for the transmission of power operable by fluid under pressure which is simple in construction, is adapted to deliver enormous torque without pulsations, and is efficient in operation.

The invention is not to be understood as limited to the details described, since these may be modified within the scope of the appended claims without departing from the spirit and scope of the invention.

Having thus described the invention, what I claim as new and desire to secure by Letters Patent is:

1. A motor operable by fluid under pressure comprising: a casing; an output shaft extending into and journalled in the casing; a series of radial cylinders in the casing; pistons radially slidable in the cylinders; valve-means including an annular member longitudinally offset from the cylinders, and a stationary member on the casing extending into said annular member for controlling the flow of fluid under pressure to and from the cylinders for operating the pistons; an annular series of pinions rotatably mounted in the casing, crank-elements on the pinions operable by the radial movement of the pistons, respectively, for driving said pinions; and a gear-wheel around and fixed to rotate with said annular valve member, the valve-member being fixed to rotate with the output shaft.

2. A motor operable by fluid under pressure comprising: a casing; an output shaft extending into and journalled in the casing; a pair of series of radial cylinders in the casing; pistons radially slidable in the cylinders; valve-means including an annular member fixed to rotate with the output shaft and between the series of cylinders and a stationary member on the casing extending within said annular member for controlling in rotative succession the flow of fluid under pressure to and from the cylinders, for operating the pistons; an annular series of pinions rotatably mounted in the casing; a pair of crank-elements on each of the pinions, oppositely disposed relatively to its axis, and operable by the radial movement of a pair of the pistons in the series, respectively, for driving said pinions; and means for driving the shaft from said pinions.

3. A motor operable by fluid under pressure comprising: a casing; an output shaft extending into and journalled in the casing; a pair of series of radial cylinders in the casing; pistons radially slidable in the cylinders; valve-means for controlling in rotative succession the flow of fluid under pressure to and from the cylinders, for operating the pistons; an annular series of pinions rotatably mounted in the casing; a pair of crank-elements on each of the pinions, oppositely disposed relatively to its axis, and operable by the radial movement of a pair of the pistons in the series, respectively, for driving said pinions; and a gear-wheel meshing with the pinions, said valve-means including an annular member within the gear and fixedly secured to the shaft between the series of cylinders.

4. A motor operable by fluid under pressure comprising: a casing; an output shaft extending into and journalled in the casing; a pair of annular series of radial cylinders in the casing; pistons radially slidable in the cylinders; valve-means controlled by the rotation of the shaft for controlling the flow of fluid under pressure to and from the cylinders for operating the pistons; an annular series of pinions rotatably mounted in the casing; a pair of rollers eccentrically journalled on each side of the pinions, operable by the radial movement and having a rolling engagement with the outer ends of a pair of pistons in the series of cylinders, respectively, for driving said pinions; and means for driving the shaft from the pinions.

5. A motor operable by fluid under pressure comprising: a casing; an output shaft extending into and journalled in the casing; a pair of annular series of radial cylinders in the casing; pistons radially slidable in the cylinders; valve-means controlled by the rotation of the shaft for controlling the flow of fluid under pressure to and from the cylinders for operating the pistons; an annular series of pinions rotatably mounted in the casing; a pair of rollers eccentrically journalled on each side of the pinions, operable by the radial movement and having rolling engagement with the outer ends of a pair of pistons in the series of cylinders, respectively, for driving said pinions; and a gear-wheel meshing with the pinions, on the shaft, the valve-means including a sleeve on the gear-wheel.

6. A motor operable by fluid under pressure comprising: a casing; an output shaft extending into and journalled in the casing; a pair of annular series of radial cylinders in the casing and spaced apart longitudinally of the shaft, with the cylinders in one series longitudinally aligned with those in the other; pistons radially slidable in the cylinders; valve-means for controlling the flow of fluid under pressure to and from the cylinders, for operating the pistons; an annular series of pinions journalled in the casing; crank-elements disposed at the ends of the pinions, respectively, and operable by pistons in a longitudinally aligned pair of cylinders, respectively; and means for driving the shaft from the pinions, the valve-means including an annular member within and to which the gear is fixed and integrally connected to the shaft between the series of cylinders.

7. A motor operable by fluid under pressure comprising: a casing; an output shaft extending into and journalled in the casing; a pair of annular series of radial cylinders in the casing and spaced apart longitudinally of the shaft with the cylinders in one series longitudinally aligned with those in the other; pistons radially slidable in the cylinders; valve-means for controlling in rotative succession the flow of fluid under pressure to and from the cylinders for operating the pistons; an annular series of pinions journalled in the casing; rollers eccentrically journalled on the ends of the pinions, respectively, and operable by having rolling engagement with the outer ends of pistons in a pair of annular series of cylinders, respectively, the output shaft being extended in the casing at both series of the cylinder and a gear rigid with the shaft meshing with said pinions for driving the shaft and operating the valve-means.

8. A motor operable by fluid under pressure comprising: a casing; an output shaft extending into and journalled in the casing; a pair of annular series of radial cylinders in the casing and spaced apart longitudinally of the shaft, the cylinders in one series being longitudinally aligned with those in the other; pistons radially slidable in the cylinders; valve-means for controlling the flow of fluid under pressure to and from the cylinders for alternately operating the pistons in longitudinally aligned cylinders; an annular series of pinions journalled in the casing; crank-elements on both ends of the pinions, respectively, and operable by pistons in annular series of cylinders, respectively, a gear between the series of cylinders and meshing with said pinions for driving the shaft and means including an annular valve-member and extending between the series of cylinders secured to the gear and securing the shaft for rotation with the gear.

9. A motor operable by fluid under pressure comprising: a casing; an output shaft disposed longitudinally of and journalled in the casing; an annular series of radial cylinders in the casing; an annular series of pistons radially slidable in the cylinders; an annular series of pinions corresponding in number to the pistons in the cylinders; crank-elements on the pinions operable by the pistons, respectively; a gear for driving the shaft, meshing with the series of pinions; and valve-means for controlling the flow of fluid to and from the cylinders including a stationary member in the casing provided with a series of ducts for delivering fluid to and from the cylinders, respectively, and a sleeve rotatable around the stationary member and with the gear and provided with groups of ducts, each group controlling the flow of fluid to and from the ducts in the casing, the groups being greater in number than the number of cylinders for producing a greater number of piston strokes than the number of cylinders in the series during each revolution of the shaft.

10. A motor operable by fluid under pressure comprising: a casing; an output shaft disposed longitudinally of and journalled in the casing; a pair of annular series of radial cylinders in the casing; annular series of pistons radially slidable in the cylinders; an annular series of pinions corresponding in number to the pistons in each series of cylinders; crank-elements on the opposite ends of the pinions operable by the pistons in the series of cylinders, respectively; a gear meshing with the series of pinions; and valve-means for controlling the flow of fluid to and from the cylinders, including valve-means for controlling the flow of fluid to and from the cylinders, including stationary members in the casing, each provided with a series of ducts for delivering fluid to and from the cylinders of one series, and a sleeve rotatable around the stationary members with the gear and provided with groups of ducts, each group controlling the flow of fluid to and from the ducts in the casing for a cylinder in each series, the groups being greater in number than the number of cylinders in each series, for producing a greater number of piston strokes than the number of cylinders in each series during each revolution of the shaft.

11. A motor operable by fluid under pressure comprising: a casing including a pair of end-sections, one of which is provided with an annular inlet for fluid and the other of which is provided with an annular exhaust duct for fluid; an output shaft extending into and journalled in the sections; an annular series of radial cylinders on each of the end-sections; pistons radially slidable in the cylinders; a series of pinions journalled in the casing; crank-elements for driving the pinions, at the opposite ends of each pinion, and operable by pistons in the annular series of cylinders, respectively; a gear meshing with the pinions; sleeves around the shaft; annular inward extensions on the sections in which the sleeves are fixed; a valve-sleeve extending around said extensions and rotatable with the gear, said valve-sleeve, extensions and inner sleeves being provided with ducts and ports for alternately controlling the flow of fluid between the inlet and outlet ducts and the cylinders in the annular series; and means between the extensions for connecting the valve-sleeve and the shaft.

12. A motor operable by fluid under pressure comprising: a casing including a pair of end-sections; an output shaft extending into and journalled in the sections; an annular series of radial cylinders integrally formed in each of the end-sections; pistons radially slidable in the cylinders; a series of pinions journalled in the casing; crank-elements for driving the pinions and at the opposite ends of each pinion and operable by pistons in the annular series of cylinders, respectively; a gear meshing with the pinions; sleeves around the shaft; annular inward stationary extensions on the sections in which the sleeves are fixed; a valve-sleeve extending around said extensions and operable by the gear, said valve-sleeve, extensions and inner sleeves being provided with ducts and ports for alternately controlling the flow of fluid to and from the cylinders in the annular series; and means between the extensions for connecting the valve-sleeve and the shaft.

13. A motor operable by fluid under pressure comprising: a casing including a pair of end-sections, each provided with an annular duct, one for fluid under pressure and the other for exhaust; an output shaft extending into and journalled in the sections; an annular series of radial cylinders on each of the end-sections; pistons radially slidable in the cylinders; a series of pinions journalled in the casing; crank-elements for driving the pinions and at the opposite ends of each pinion and operable by pistons in the annular series of cylinders, respectively; a gear meshing with the pinions; stationary sleeves around the shaft; annular inward extensions on the sections in which the sleeves are fixed; a valve-sleeve within the gear, said valve-sleeve, extensions and inner sleeves being provided with ducts and ports for alternately controlling the flow of fluid between the annular ducts and the cylinders in both annular series; and means between the extensions for connecting the valve-sleeve and the shaft.

14. A motor operable by fluid under pressure comprising: a casing including a pair of end-sections and intermediate annular sections; an output shaft extending into and journalled in the end-sections; an annular series of radial cylinders integrally formed in each of the end-sections; pistons radially slidable in the cylinders; a series of pinions, each journalled in both of the intermediate sections of the casing; crank-elements for driving the pinions and at the opposite ends of each pinion and operable by pistons in the annular series of cylinders, respectively; a gear secured to the shaft and meshing with the pinions; annular inward stationary extensions on the sections; inner stationary sleeves in the extensions; a valve-sleeve rotatable with the gear, said valve-sleeve, extensions and inner sleeve being provided with ducts and ports for alternately controlling the flow of fluid to and from the cylinders in both annular series in rotative succession; and means between the extensions for connecting the valve-sleeve and the shaft.

15. A motor operable by fluid under pressure comprising: a casing provided with a single inlet for fluid and a single exhaust for fluid; an output shaft disposed longitudinally of and journalled in the casing; a pair of annular series of radial cylinders adjacent the ends of the casing; an annular series of pistons radially slidable in the cylinders; an annular series of pinions, crank elements on the ends of the pinions operable by the pistons in the series of pinions, respectively; a gear for driving the shaft meshing with the series of pinions and disposed between the series of cylinders; and valve-means for controlling the flow of fluid from the inlet to the series of cylinders and from the series of cylinders to the outlet, including stationary members in the casing, each provided with a series of ducts for delivering fluid to and from each series of cylinders, and a sleeve between the series of the cylinders rotatable with the gear around both stationary members between the series of cylinders and provided with groups of ducts, each group controlling the flow of fluid to and from the ducts in the casing for a cylinder in each series.

JAMES E. MORTON.

REFERENCES CITED

The following references are of record in the file of this patent:

UNITED STATES PATENTS

| Number | Name | Date |
|---|---|---|
| 717,445 | Nestius | Dec. 30, 1902 |
| 1,455,443 | Mayer | May 15, 1923 |
| 792,663 | Lufkin | June 20, 1905 |
| 2,253,490 | Bakewell | Aug. 26, 1941 |
| 396,451 | Abbe | Jan. 22, 1889 |
| 1,924,423 | Svenson | Aug. 29, 1933 |
| 2,246,074 | Joy | June 17, 1941 |